Patented July 15, 1947

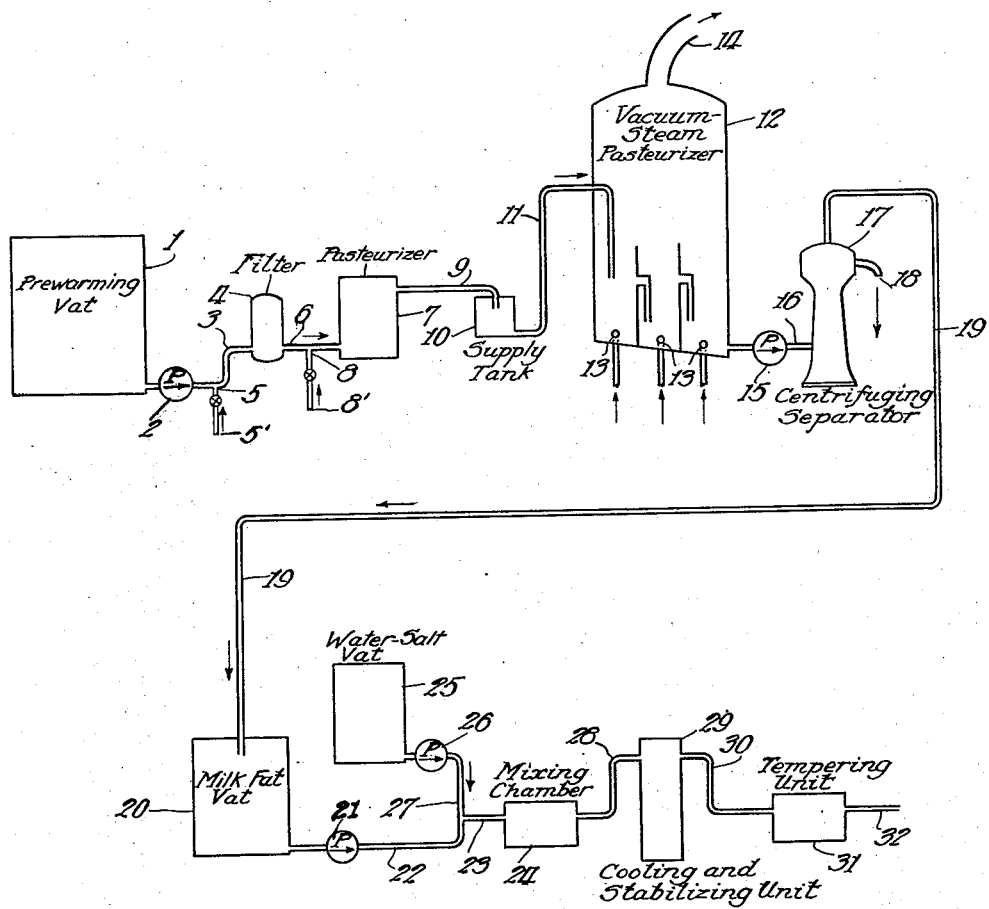

2,423,834

UNITED STATES PATENT OFFICE 2,423,834

MILK FAT CONCENTRATE PROCESS

Herman C. Horneman, Ralph V. Hussong, and Sidney N. Quam, Danville, Ill., and Bernard W. Hammer, Ames, Iowa, assignors, by direct and mesne assignments, to Sugar Creek Creamery Company, Danville, Ill., a corporation of Delaware, and Cherry-Burrell Corporation, Chicago, Ill., a corporation of Delaware, as joint owners Application December 6, 1940, Serial No. 368,750

6 Claims. (Cl. 99—62)

The present invention relates to processes of producing milk fat concentrate and in particular to improvements in processes of producing butter.

Prior processes used in the commercial manufacture of butter are all essentially the same and are known as batch processes. These processes employ a churn and cream of around thirty per cent fat and produce buttermilk in addition to butter. Excepting preliminary cream treatments and minor apparatus or mechanical changes there has not been a real improvement in commercial butter making processes per se in over thirty years.

The art has long recognized the need for improvements in processes for producing butter and prior investigators have suggested various modifications of the old processes. One of these modifications suggests a process for producing butter from a plastic or super cream containing not less than sixty-five per cent milk fat. This particular modification as well as other like modifications include a converter or agitating means in order to reverse the phase of the milk fat, i. e. change the fat which is present in the cream in the dispersed phase to the continuous phase. Modifications of this type calling for the reversal of phase in a high fat cream product have not been found entirely satisfactory and as a result have not gone into commercial use up to the present time.

It is an object of the present invention to provide an improved process for producing a milk a milk fat concentrate.

It is also an object of the present invention to provide an improved process for producing butter.

It is another object of the present invention to provide a continuous process for producing improved butter.

It is a further object of the present invention to provide commercially satisfactory processes for producing milk fat concentrate and butter free from the objections found in prior processes.

Other objects will be apparent as the description hereafter proceeds.

We have discovered after an extensive research investigation commercially satisfactory processes for producing milk fat concentrate and butter of the type desired. These processes comprise generally introducing cream into a zone or chamber of sub-atmospheric pressure, subjecting the cream while at the reduced pressure to the direct action of steam, concentrating the milk fat in said cream by subjecting the treated cream while at a temperature above the melting point of said fat to a centrifuging action, separating the concentrated milk fat obtained in the continuous phase by said centrifuging action from other constituents of said cream, and then working said concentrated fat product to produce butter of the desired texture. The cream used in the above process may or may not be pretreated although the use of a high quality pasteurized cream is ordinarily preferred.

For a more complete understanding of the nature and scope of our invention, reference may be had to the following detailed description, taken in connection with the accompanying drawing wherein the single figure is a flow sheet diagrammatically illustrating our invention.

An aspect of this invention referring to the method of manufacturing butter is described and claimed in our divisional application entitled "Butter manufacture" filed November 2, 1945, Serial No. 626,233.

An aspect of our invention directed to a process for treating cream is described and claimed in our divisional application Serial No. 741,090 filed April 12, 1947, entitled "Dairy process."

An aspect of our invention directed to the improved mechanism for processing a dairy product and manufacturing butter according to this invention is described and claimed in our divisional application Serial No. 741,089, filed April 12, 1947, entitled "Dairy system."

An aspect of the present invention directed to the improved butter product is described and claimed in our divisional application Serial No. 741,088, filed April 12, 1947, entitled "Butter."

Our co-pending application Serial No. 422,798, now Patent No. 2,395,051, entitled "Buttermaking means" was granted as a continuation in part of this application.

In the drawing, cream ordinarily of around 30–40 per cent milk fat is warmed to about 90°–110° F. in prewarming vat 1. (If neutralization of the cream is desired, it may be carried out, for example, in the prewarming vat in accordance with general practices in the art.) From vat 1 the cream is next pumped by pump 2 through conduit 3 into filter 4. Steam at around 90–100 lbs. is introduced into conduit 3 at 5 from a steam supply line 5' so that the cream enters the filter around 135° F. From the filter 4 the cream passes by conduit 6 into flash pasteurizer 7, for example, of the well known "Jensen" type. Steam is also introduced into conduit 6 at 8 from a steam supply line 8' so that the cream enters the bottom of the pasteurizer at around 150°–160° F. The cream ordinarily remains in pasteurizer 7 for about 10–15 seconds where it is heated to about 190°–194° F., for example, by indirect steam. From the top of pasteurizer 7 the cream passes by conduit 9 to supply tank 10 where it is ready for passing to the zone of sub-atmospheric pressure or vacuum-steam treatment.

The cream ordinarily around 175°–190° F. is drawn through conduit 11 into vacuum pasteurizer 12 which may be of the type described in detail in Hammer et al. Patent No. 2,022,420. The pressure in the pasteurizer or chamber 12 is sub-atmospheric and is ordinarily maintained around 25–26 inches of mercury so that the temperature in the chamber will be around 130°–135° F. Steam at around 90 lbs. is introduced into the bottom of the pasteurizer 12 through steam pipes 13 as shown, whereby it comes into direct contact with the cream while at the reduced pressure. The desired pressures and temperatures are readily maintained in chamber 12 by withdrawing water vapor and volatile off-flavors at 14 by means of a vacuum pump (not shown). The treated cream with practically no loss or gain in its moisture content collects at the bottom of chamber 12 and is then pumped by pump 15 through conduit 16 to centrifuging separator 17. The temperature of the cream in the separator is ordinarily around 125° F. and in every case should be at least above the particular melting point of milk fats present in the cream.

In the separator 17 (which may be of the ordinary centrifuge type) the milk fats are obtained in the continuous phase and are separated from the proteins, skim milk, etc., which are expelled at 18. The fat product containing about 80–98 per cent milk fat, depending upon the extent of the centrifuging action, is next passed by conduit 19 to vat 20. From vat 20 the milk fats still in the liquid state and continuous phase are pumped by pump 21 through conduits 22 and 23 to mixing chamber 24. Vat 25 contains a controlled aqueous solution of salt, starter flavors, etc. which may be pumped at a predetermined rate by pump 26 through conduits 27 and 23 into the mixing chamber 24 in which it is mixed with the fat coming from vat 20. The resulting mixture containing at least 80 per cent milk fat is then passed from the mixer 24 by conduit 28 to a cooling and stabilizing unit 29 wherein the temperature thereof drops to around 40°–60° F. The cooled mixture is drawn from cooler 29 through a conduit 30 into tempering unit 31 wherein the desired texture of the product is developed. The tempered product is then forced from the tempering unit 31 and passes by way of conduit 32 to a suitable packaging machine (not shown).

It will be understood that the above representative detailed process is merely illustrative and that the present invention is not limited thereto. The pretreatments including filtering and pasteurizing may be modified or eliminated in whole or in part as desired. Pasteurization, for example, may be carried out entirely by mixing steam and cream. The working of the milk fat after discharge from the separator including mixing with water, and with salt if a salted butter is desired, etc., as well as cooling and tempering (known in the art as butter aging) may also be modified as desired. Optimum conditions, which may vary with the milk fat which in turn varies with the seasons of the year, may readily be determined by experimental test.

The temperatures and pressures in the vacuum pasteurizer and separator included in the above detailed description represent one set of conditions of preferred operation. These illustrative temperatures and pressures, however, may also be modified as desired, optimum conditions including time of treatment (e. g. 5–30 minutes in the vacuum pasteurizer) varying with the particular cream undergoing treatment.

The change in the cream during the vacuum-steam treatment is not fully understood. Our investigations indicate that subjecting the cream to the sub-atmospheric pressure produces an expansion of the cream and that the action of the steam (e. g. high pressure steam of around 90–100 lbs. back of the valve) coming into direct contact with the cream while in the expanded state modifies the milk fat globules so that they separate in the continuous phase when subjected to the centrifuging action in the separator. Our investigations also indicate that the best results are obtained when the cream entering the zone of sub-atmospheric pressure is preheated to a temperature greater than the temperature of saturated steam at the reduced pressure. The fact that the fat is obtained in the continuous phase indicates that the complex protein-fat hull or membrane surrounding the milk-fat globules is modified physically or chemically, or both, by the combined vacuum and steam treatment in chamber 12. It will be understood, however, that the present invention is not limited by theoretical explanations.

The adding of a controlled amount of water to the concentrated fat makes possible a more uniform or finer dispersion of water in fat resulting in improved butter texture. The amount of water added varies with the percentage of milk fat in the fat concentrate (ordinarily around 85–95 per cent) and is controlled so that the final product contains at least eighty per cent milk fat.

The process of the present invention produces a more stable butter due to the fine dispersion and low protein content. A substantial proportion of nitrogenous material—one of the bacterial foods of butter—is separated from the milk fat in the centrifuging separator. The process of the present invention also produces a more stable butter due to the removal of the original water and the water soluble materials in the cream which, as obtained in practice, contains only around 35 per cent of the desired milk fat. The advantages obtainable by replacing these original non-fat materials with controlled water starter mixtures free from undesired contaminations will be obvious to those skilled in the art. An additional advantage of the present invention resides in the elimination of "churning," carried out today for the most part in bacterial contaminated wooden churns.

It will be obvious to those skilled in the art that the milk fat concentrate of the present invention is particularly adaptable for use as an intermediate in the preparation of a quality and composition controlled butter. It will also be obvious to those skilled in the art that the milk fat concentrate is also adaptable for use in the manufacture of cheese, ice cream, frozen desserts, confections, baked goods and the like.

It will be understood that the present invention is not limited to the illustrative process herein described. All modifications coming within the scope of the present invention are intended to be covered in the appended claims.

In the specification and claims the term "starter" refers to starter cultures. These cultures are well known in the art and serve as flavoring means in butter manufacture. In the specification and claims the term "cream" refers to ordinary cream in which the milk fat is in the dispersed phase, i. e. dispersed as an emulsion in a continuous phase of non-fat milk liquids. Cream products differ materially from the concentrated fat or "fat concentrate" of the present invention in which the milk fat is present in the continuous phase.

We claim:

1. The process of making a milk fat concentrate of value as an intermediate in the process of producing butter, which comprises subjecting cream containing milk fat in the dispersed phase to reduced pressure, subjecting the cream while at the reduced pressure to the direct action of steam, concentrating the milk fat by subjecting the treated cream while at a temperature above the melting point of said fat to a centrifuging action, and separating the concentrated fat in the continuous phase from the other constituents of said cream.

2. The process of making a milk fat concentrate which comprises subjecting hot cream containing about 30-40 per cent milk fat in the dispersed phase to reduced pressure, subjecting the cream while at the reduced pressure to the direct action of steam, concentrating the milk fat by subjecting the treated cream while at a temperature above the melting point of said fat to a centrifuging action, and separating the concentrated fat obtained in the continuous phase by said centrifuging action from other constituents of said cream.

3. The process of making a milk fat concentrate which comprises introducing cream, into a zone of sub-atmospheric pressure, at a temperature substantially greater than the temperature of saturated steam at said pressure, subjecting the cream while at the reduced pressure to the direct action of high pressure steam, concentrating the milk fat of said cream by subjecting the treated cream while at a temperature above the melting point of said fat to a centrifuging action, and separating the resulting concentrated fat obtained in the continuous phase by said centrifuging action.

4. The process of making a milk fat concentrate which comprises subjecting warmed pasteurized cream containing about 30-40 per cent milk fat in the dispersed phase to reduced pressure so as to produce an expansion of said cream, subjecting the cream while at the reduced pressure to the direct action of high pressure steam, concentrating the milk fat in the continuous phase by subjecting the treated cream while at a temperature above the melting point of said fat to a centrifuging action, and separating the resulting concentrated fat containing at least 80 per cent milk fat.

5. The process of making an improved milk fat concentrate of low protein content, which comprises introducing pasteurized cream at a temperature of around 175°–190° F. and containing around 35 per cent milk fat in the dispersed phase into a zone of sub-atmospheric pressure, subjecting the cream while at the reduced pressure to the action of high pressure steam, withdrawing water vapor from said zone so as to keep down said pressure and maintain a temperature of about 130°–135° F. within said zone, concentrating the milk fat by subjecting the treated cream while at a temperature around 125° F. to a centrifuging action, and separating the resulting concentrated fat containing about 85–95 per cent milk fat in the continuous phase.

6. A method of producing butter oil comprising violently agitating a 30 to 40% butterfat cream (a fat in water emulsion) to destabilize the emulsion and heating at a temperature at which the butterfat is liquefied, and thereafter centrifugally separating the butterfat, while liquefied, from the major portion of said water to produce a butter oil product containing 80 to 98% of butterfat in the continuous phase.

HERMAN C. HORNEMAN.
RALPH V. HUSSONG.
SIDNEY N. QUAM.
BERNARD W. HAMMER.

REFERENCES CITED

The following references are of record in the file of this patent:

UNITED STATES PATENTS

| Number | Name | Date |
|---|---|---|
| 2,022,420 | Hammer et al. | Nov. 26, 1935 |
| 2,168,376 | Meulen et al. | Aug. 8, 1939 |
| 2,150,943 | Sharples | Mar. 21, 1939 |

OTHER REFERENCES

Rogers, "Fundamentals of Dairy Science," second edition, pages 199 and 200. Published 1935 by Reinhold Publishing Corporation, New York.

Hunziker, "The Butter Industry," third edition, pages 306, 307, 381, and 382. Published June, 1940, by the author, La Grange, Illinois.

Plastic Cream by L. P. Sharples, The Ice Cream Review, pages 31, 32, 64 of August 1937.